Figure 1:
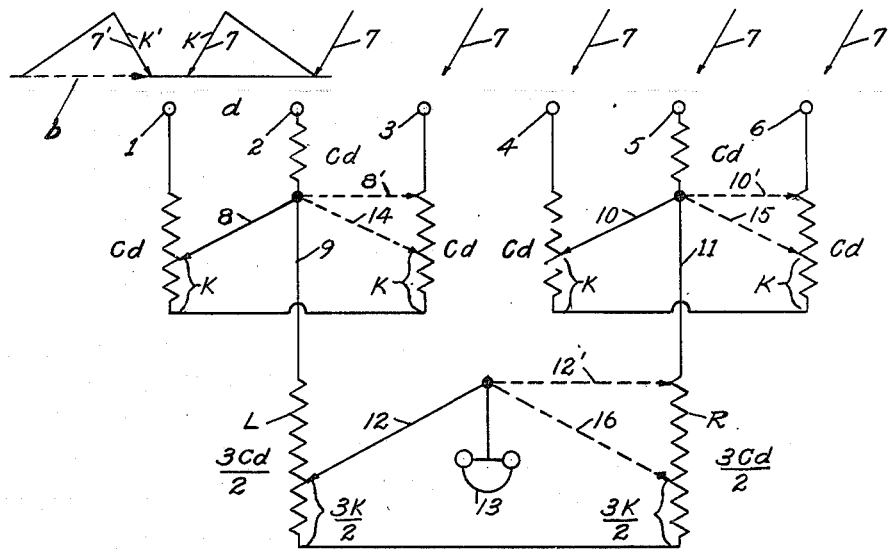

April 8, 1930.  B. R. HUBBARD  1,753,418
DIRECTION FINDING
Filed April 18, 1927   3 Sheets-Sheet 1

INVENTOR.
Beverly R Hubbard
BY
Ezekiel Wolf
ATTORNEY.

April 8, 1930.  B. R. HUBBARD  1,753,418
DIRECTION FINDING
Filed April 18, 1927  3 Sheets-Sheet 3
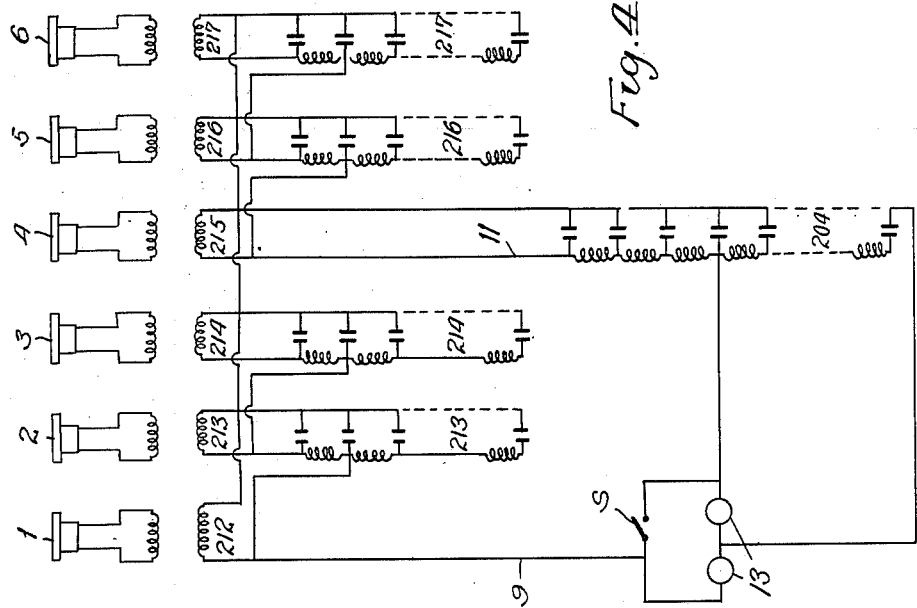
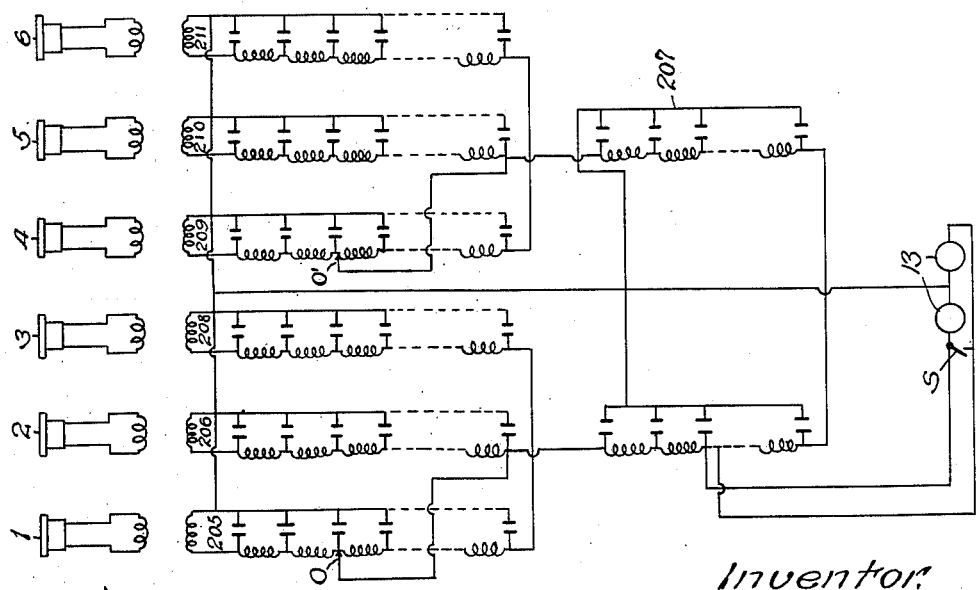
Inventor:
Beverly R. Hubbard
By Ezekiel Wolf
his Attorney Patented Apr. 8, 1930

1,753,418

UNITED STATES PATENT OFFICE

BEVERLY R. HUBBARD, OF HIGGANUM, CONNECTICUT, ASSIGNOR TO SUBMARINE SIGNAL CORPORATION, OF BOSTON, MASSACHUSETTS, A CORPORATION OF DELAWARE

DIRECTION FINDING

Application filed April 18, 1927. Serial No. 184,826.

The present invention relates to a system and apparatus for sound reception and more particularly to the determination of the direction of a source of sound by the binaural method. The general principle involved in the system of determining the direction of a source of sound by the binaural method is that two sets of receivers are employed, one constantly associated with one ear and the other with the other ear. In a way, these two sets of receivers are in effect substitute listening devices for the ears. The sound so received and transmitted to the ears gives the listener a definite impression of direction, either to the right or to the left, from which he expects the sound is approaching. The binaural system of direction finding employs, in addition, means whereby this directional impression is shifted from, let us say, its natural position to a central position of coming from straight ahead, with the resulting quantitative determination of the substantially exact direction of the sound source.

This is accomplished by means known as a compensator. In general the system used for determining the direction of a source of sound employs a plurality of receivers of sound equally spaced along a base line. The receivers which may be purely acoustic or serve to translate the sound impulses to corresponding electrical variations are usually grouped in groups with proper retardation means connected in the groups to bring the impulses in time synchronism. Such groups have quite commonly been made up of three units, while the total number of units employed has ranged from four to thirty-six in actual practice.

The method usually employed in grouping and compensating, known as the multispot system, groups three receivers together, the middle receiver of which has a fixed amount of compensation equivalent to the time interval for sound to travel from the adjacent receivers to it. The two end receivers have a total length of time compensation between them equivalent to twice that of the fixed compensation connected with the middle receiver, but switching means are provided for breaking the so called compensating line at successive progressing points until this line is divided in just the right proportion to bring the impulses from the three receivers in exact time synchronism.

The method of compensation which I employ in my invention is somewhat different and has certain advantages over the method described above, not only in using a smaller total amount of compensating means but also in allowing a better design, particularly with regard to matching the compensating lines in successively related groups, as will be explained shortly with reference to the drawings.

Further, I have devised a system employing just half the number of lines which would be necessary in my improved method of compensation were certain switching means used in my invention omitted. Ordinarily, switching means are undesirable, but in my system the operation of the mechanism is never interrupted by the switching operation, nor would the operator ever know through working the apparatus that half the compensating lines are omitted so that from the point of view of operation there can be no objection to the system. Since in the ordinary electrical compensator the number of coils and condensers goes up to the thousands, it is very evident that a means by which the number of coils may be cut in halves is exceedingly useful.

Figure 2:
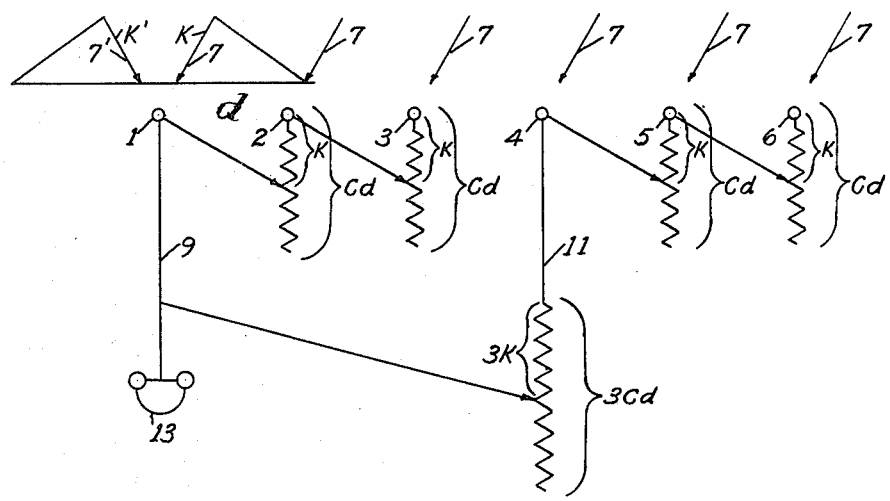
Figure 3:
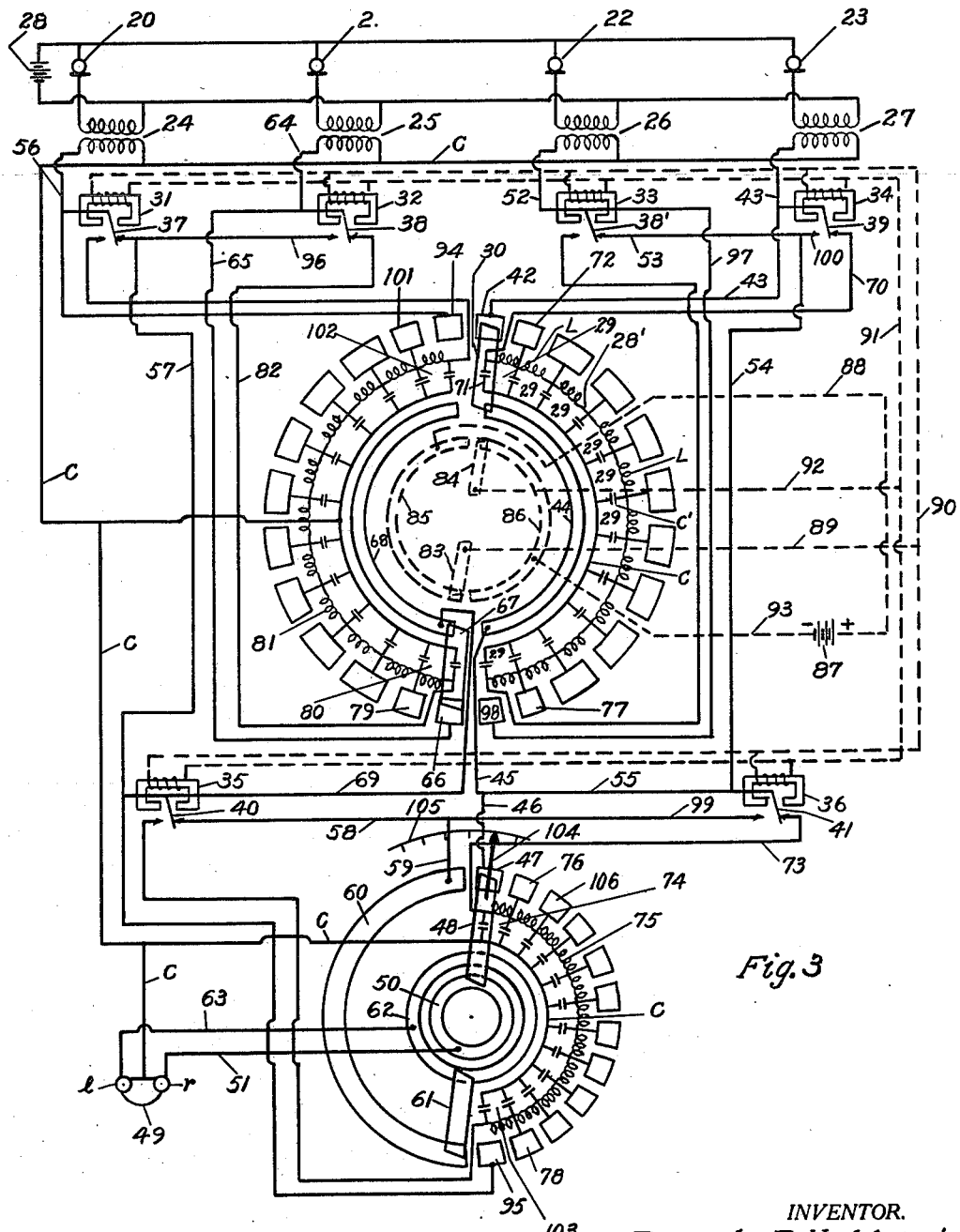

A better understanding of the present invention will be gained from a description with reference to the drawing, in which Figure 1 shows a system employing the multispot method of compensation, Figure 2 a system employing my method of compensation, Figure 3 a diagrammatic layout of my complete system as applicable to a so called four spot compensator, Figure 4 illustrates the circuit of Figure 2 and Figure 5 the circuit of Figure 1.

In Figure 1 the sound receivers are represented by numerals 1 to 6 inclusive, by which the sound waves approaching from the direction of the arrows 7 are received. The central receivers 2 and 5 have in this system a fixed compensation or retardation $Cd$ equivalent to a time interval necessary for sound to travel the distance $d$ between the receivers. The receivers 1 and 3, and 4 and 6 have connected between them a total compensating or retardation interval equivalent to twice this distance, or $2Cd$. It may be noted, therefore, that if, for instance, sound were approaching the receivers from a direction along the base of the receivers, as shown by the dotted arrow $b$, all of the compensation $2Cd$ would have to be connected to the receiver 1 in order to bring the sound received at the receiver 1 in time synchronism with sound received at the receiver 3. The arrow 8 would then be in the dotted position 8' and impulses from the three receivers 1, 2 and 3 would be transmitted in time synchronism along the line 9. Under these circumstances the receiver 1 would have $2Cd$ compensation, the receiver 2 would have $Cd$ compensation and the receiver 3 would have no compensation. The receivers 4, 5 and 6 would be similarly compensated, 4 having $2Cd$, 5 having $Cd$ and 6 having no compensation.

Consider now the combined impulses in the lines 9 and 11 respectively. They would be out of time synchronism by an interval corresponding to a distance of $3d$. That is, the impulse in the line 9 would have to be retarded $3Cd$ or the arrow 12 would assume the dotted position 12', thereby inserting in the line 9 the entire compensation of L and R. The impulse at the headphones 13 would be in exact time synchronism.

Now suppose sound was coming from the direction shown by the arrow 7 and as shown in Figure 1 this direction caused the sound to arrive at successive receivers from the right to the left at intervals corresponding to the distance K. Under these circumstances, considering the left group first, the receiver 3 being first to receive the sound has a compensation of $Cd+K$, the receiver 2 a compensation of $Cd$ and the receiver 1 a compensation of $Cd-K$. The right group of receivers has decreasing amounts of compensation in exactly the same fashion by the same amounts; namely, K from right to left.

But what about the lines 9 and 11. The difference in compensation must, of course, be 3K since the lines 11 and 9 have an equivalent spacing of $3d$ and since now for a distance $d$ the retardation is K. The arrow 12 must therefore be set at a point where the line 11 has 3K more retardation than the line 9. Since the total length remains constant and is $3Cd$, the amount of compensation in the line 11 is $3Cd/2+3K/2$ and the amount in the line 9 is $3Cd/2-3K/2$, which gives a difference of 3K. From a little consideration it will at once appear that this method of compensation always compels a different and fractional adjustment of units in the second stage of compensation than the first. That is, in order to divide the compensating line LR into values of $3Cd/2+3K/2$ and $3Cd/2-3K/2$ the individual steps of compensation must at least be units as small as K/2 in order to obtain the desired division, whereas the lines between the receivers 1 and 3, and 4 and 6 may be made up of units in steps of K and not K/2.

The objection to this method of compensation is, therefore, that the units in the successive stages of compensation must be half as large as those in the prior stage, with, of course, the added result that a total of twice the number of units is required. In addition to this, there is a still further objection. A retardation line composed of a set of units has definite characteristics with respect to admittance, impedance, surge impedance, resistance, attenuation, retardation, and so forth, for a range of frequencies dependent upon the design of the units. Where, therefore, the retardation per section is cut in halves, the characteristics of the lines are changed and two lines connected together, one having sections of half the retardation of the other, may not only have objectional reflections but may also so attenuate certain frequencies that the impulses are practically killed.

In my system of compensation shown in Figure 2, the method of compensation is different from that in Figure 1. In Figure 2 the same direction of the source of sound is assumed as in Figure 1 and similarly as in Figure 1, receiver 3 must have 2K more units of compensation than receiver 1. In the present method, therefore, receiver 3 has 2K units of retardation, receiver 2, K units of compensation and receiver 1 no compensation. Contrary as in Figure 1, the compensation connected to receiver 2 is not fixed. Receivers 3 and 2 are compensated for time synchronism with receiver 1 and likewise receivers 6 and 5 for time synchronism with receiver 4. Receiver 4 is then compensated for time synchronism with receiver 1 by 3K units of compensation, since receivers 1 and 4 are a distance $3d$ apart.

It will be noted that the same units may be used in composing the lines $Cd$ as $3Cd$, namely the unit K. It will be noted further, comparing with Figure 1, that the total length of compensating lines in Figure 1 is $9Cd$ while in Figure 2 it is $7Cd$. However, this gain is only possible by the use of a switching system which also forms a part of this invention, as will presently be explained.

Suppose the sound in Figure 1 were coming from a direction 7', demanding the same amount of compensation K' as K but on the left instead of the right. The position of the arrows 8, 10 and 12 respectively in Figure 1 will simply be placed in the new positions 14, 15 and 16, and the apparatus shown in the figure will suffice.

However, in Figure 2 such is not the case, since no compensation is shown in line with the receivers 1 and 4 as with receivers 2, 3, 5 and 6. But this is cared for by the switching system shown in Figure 3, by which means the compensating line connected with receiver 3 is shifted to receiver 1, and similarly the compensating line with receiver 6 to receiver 4. The compensating line connected with line 11 is also shifted to line 9. In this manner, proper and sufficient compensating means are provided to compensate for sound received in any direction. This switching system is shown in connection with Figure 3.

Figure 5 shows the circuit of the diagram of Figure 1. The hydrophones 1 to 6 inclusive each feed through a transformer to the lines 205, 206, 208, 209, 210 and 211 respectively; the lines 205, 206 and 208 form one group and lines 209, 210 and 211 form the other group. The line 206 is fixed in length and feeds into 205 and 209 which are really parts of the same line at a point O to bring the waves from the three receivers into phase. Similarly 210 feeds into 209 and 211 at the point O'. The waves at the points O and O' feed into the ends of the line 207 which is broken by the phone 13 to obtain correct compensation for impulses coming from both left and right.

If the switch S is open, the balance is binaural; if closed, by the maximum method, as then the impulses are fed in parallel to both ears.

In Figure 4 the circuit of Figure 2 is shown. The hydrophones here, too, feed through transformers to the lines 212, 213, 214, 215, 216 and 217. The line 217 feeds directly to the beginning of line 216 and 216 to the beginning of line 215.

The line 214 feeds directly to the beginning of line 213 and 213 to the beginning of line 212. The line 212 connects by 9 to the head phone 13 and the line 215 through the line 204 to bring the waves in phase at the head phones. The line 204 could be cut in third by making 215 similar to 216 and feeding it to 214 in the same manner as the other connections are made. This would then be a maximum balance somewhat similar to that obtained when the switch S is closed. If the switch S is open the balance is binaural.

In Figure 3 the system is shown with four units, comprising the microphones 20, 21, 22 and 23. These microphones are of the usual type and serve to cause electric variations in the transformers 24, 25, 26 and 27 by means of varying the resistance across the battery 28. The compensating line for the two microphones 22 and 23 is indicated by 28' and is composed of equal sections 29, comprising inductances L in series and capacities C' in shunt. A switch 30 is provided for connecting as many sections of the line in circuit as are desired for proper compensation. As shown in Figure 3, the switches and relays 31, 32, 33 and 34, as well as relays 35 and 36, are set for receiving sound from dead ahead. Under these conditions, all the relay armatures 37, 38, 38', 39, 40 and 41 are thrown to the right, and also the switch blade 30 is shown contacting with the contact 42. It will be noted that in this position the secondary of the transformer 27, which is permanently connected to the contact 42 by the conductor 43, transmits the electrical impulse directly without compensation to the switch 30, the conducting segment 44, thence over the conductors 45 and 46 to the contact 47, through the switch blade 48 directly to the right telephone headset 49 by means of the conducting segment 50 and the conductor 51. The secondary of the transformer 26 in this position is tied together with the transformer 27 through the relay conducting armature 38', which connects the secondary lead 52 of the transformer with the contact 53, and thence, by means of leads 54 and 55, to the common connecting wire 46.

Evidently, therefore, for the position of the switching mechanism shown in Figure 3, the two microphones 22 and 23 are connected to the telephone R of the headset 49 without any compensation. Similarly, following through the connections of the microphones 20 and 21, the same will be found to be true. The secondary of the transformer 24, associated with the microphone 20, is connected to the telephone L of the binaural headset 49 electrically as follows: Connections from the secondary 24 may be traced through the lead 56, the armature 37, the lead 57, the armature 40, the leads 58 and 59, the conducting segment 60, the switch blade 61, the conducting segment 62, the lead to the left telephone of the headset 63.

In all the circuits above described, attention is called to the fact that the return circuit is made through the common lines marked c. The lead from the transformer 25 may be traced through the leads 64 and 65, contact 66, switch blade 67, connecting segment 68, lead 69, to the armature 40, where it joins with the impulse from the receiver 20 and travels over the same electrical path as above described to the head telephone l.

If the switch blades 30, 67, 48 and 61, which usually are all rotated together, are moved from the position shown in Figure 3 clockwise to the next contact, it will be noted that the microphone 23 has introduced into its line one section 29 of the compensating line 28'. The connection from the secondary of the transformer 27 may then be traced as follows: Through the lead 43 to the armature 39, to the lead 70, to the end 71 of the compensating line marked 28'. The switch 30, then on contact 72, connects similarly as before through the conducting segment 44, the lead 45, to the lead 55, the armature 41, the conducting wire 73, through one section 74 of the compensating line 75, to the contact 76, and thence through the switch blade 48, which is at that moment connected with the contact 76, through the conducting segment 50 and the lead 51 to the right telephone $r$.

As the switch blades 30 and 48 continue to rotate clockwise, sections of the line are inserted in the microphone 23 until, upon reaching the contacts 77 and 78, the hole compensating line is finally cut in the circuit.

The only compensation in the microphone 22 is that due to the compensating line 75, as will of course be evident from a consideration of the diagram shown in Figure 2. In this case, the connections when the switch blades 30 and 48 are connecting with the contacts 72 and 76, respectively, may be traced as follows: The lead 52, the armature 38', the lead 54, the armature 41, the lead 73, section 74 of the line 75, contact 76, switch blade 48, conducting segment 50, lead 51, to the right telephone $r$. It will be noted that the same section of the compensating line 75 is connected to this receiver as is connected with the receiver 23.

From a consideration of Figure 2 it would be evident that the microphone 20 should have no compensation in its line and that the microphone 21 should be compensated only for one section of the upper compensating line, as shown in the figure and as will appear directly from the following description.

The microphone 20 is connected to $l$ of the telephone headset when the switch blades are advanced one section in a clockwise direction, as follows: Through the lead 56, armature 37, the lead 57, armature 40, leads 58 and 59, conducting segment 60, switch blade 61, segment 62, lead 63, to $l$ of the telephone headset 49. There is, therefore, no compensation in the line between the microphone 20 and the telephone $l$. In the same position, between the microphone 21 and the telephone $l$ there is only one section 80 of the compensating line 81, as is shown through the following circuit: the lead 64, armature 38, lead 82, section 80 of the line 81, contact 79 which now would be in a position to make contact with the switch blade 67, conducting segment 68, lead 69, armature 40, leads 58 and 59, etc., as just described for connection from the microphone 20 to the telephone $l$.

The relays 31, 32, 33, 34, 35 and 36 are controlled in their operation by the position of the blades 83 and 84 with respect to the semicircular conducting segments 85 and 86. The relays as shown are of the polarized type and, therefore, when current is passed through them in one direction, the armature is pulled one way and when it is passed through them in the opposite direction, the armature is pulled the opposite way. In the position shown in Figure 3, the current passes from the battery 87, through the lead 88, to the conducting segment 85, and then to the switch 83, the lead 89, the lead 90 to which all the relays are connected in shunt. The opposite ends of the relay coils are connected to the lines 91 and then to the lead 92, the switch blade 84, the conducting segment 86, and back to the battery 87 by means of the conducting wire 93.

When the switch blades are rotated in a counterclockwise direction, the blades associated with the relay energizing circuit also rotate counterclockwise, the switch blade 84 connecting with the conducting segment 85 and the switch blade 83 connecting with the conducting segment 86. In this manner the current in the wires 90 and 91 is reversed and the relay armatures which, as shown in the figure, connect with the contacts at the right, are thrown over to connect with the contacts at the left. This operation occurs in the switching system when the switch blades pass through the vertical position in the counterclockwise rotation.

One of the distinctive features of the present invention is that this change over, whereby it is possible to shift the compensating lines from the right to the left, is effected without ceasing the operation of direction finding or without the knowledge on the part of the operator that such a change is being made.

By tracing through the connections shown in Figure 3, it will be noticed that in the position occupied when the switch blade 30 contacts with the contact 94 and the other switches occupy their respective positions, no change has taken place with regard to opening the connections from the microphones to the telephones. During the movement of the switch blade 30 from the contact 42 to the contact 94, it will be noted that the width of the switch is always greater than the distance between the contacts, with the result that the blade 30 has already made connection with the contact 94 before it leaves the contact 42. During this interval of the movement of the blade 30 from 42 to 94, the relay armatures 37, 38, 38', 39, 40 and 41 go over to the left so that when the switch blade 30 makes contact with 94 the armatures are all thrown over to the left. In this position it will be noted by tracing through the electrical connections that there is no compensation in any of the microphones 20, 21, 22 and 23, so that this position and the position of the switch arms just previously mentioned is practically the same with regard to the direction of the source of sound; that is, in both these positions the system is adjusted for sound coming from dead ahead. For this reason the space occupied by the contacts 94 and 92 should be equivalent to the space occupied by one of the other segments about the circle. In this position, for illustration, the microphone 20 is connected to the left telephone $l$ in the following manner: the lead 56, the contact 94, the switch 30, the connecting segment 68, the lead 69, the contact 95, the blade 61, the conducting segment 62, the lead 63. The microphone 21 may be traced through the elements having the following numbers: 64, 38, 96, 57, 95, 61, 62, 63 and $l$. The connections for the microphone 22 may be traced through the following elements: 52, 97, 98, 67, 44, 45, 55, 41, 99, 59, 60, 48, 50, 51 and $r$. Microphone 23 may be traced through the following connecting elements: 43, 39, 100, 54, 41, 99, 59, 60, 48, 50, 51 and $r$.

In all of the above cases, the leads have been described as starting from the secondary of the transformers connected to the microphones,—as it is obvious that the impulse received by the respective microphones will be transmitted to the corresponding transformers.

When the switch blade 30 has progressed to the conducting segment 101 and correspondingly the other switch blades have advanced to another segment, one section 102 of the line 81 will be connected in circuit between the microphone 20 and the telephone $l$ and one section 29 of the line 28 will be connected in circuit between the microphone 22 and the telephone $r$. In addition, the microphones 20 and 21 have one section 103 of the line 75 connected between them and the telephone $l$. Obviously, therefore, this switching system just described fulfills the conditions for compensating for sound, counting both from the right or from the left of the normal to the line of receivers.

It will be noted that at no time in the operation, when the relays are thrown from the right to the left or vice versa, are the microphones disconnected from the telephones $l$ and $r$. Considering the microphone 23 and the switches positioned as shown in Figure 3, it will be observed that the lead 43 from the secondary of the transformer 27 connects directly with the contact 42, and that as long as the switch blade 30 remains upon the contact 42 this microphone will still be connected in circuit, even though the armature 39 should already have been drawn over to the left from its present position. The armature 39 is drawn over to the left to make connection with the contact 100 before the switch blade 30 has left the contact 42, so that upon leaving the contact 42 the microphone 23 is still connected with the telephone $r$, now however through the armature 41, the leads 99 and 59, conducting segment 60, switch blade 48, conducting segment 50, lead 51, to the telephone $r$. The only change which has been made when the blade 30 has left the contact 42 completely and moved to contact 94 with regard to the microphone 23, is that it is connected directly with the telephone $r$ instead of indirectly as it was in its previous position. Similarly, considering all the other microphones, it will be observed that at no time in the operation of the device are the microphones disconnected from the listening telephones. This, of course, allows the operation to be continuous and, further, allows the listener to follow at all times and listen to the sound.

The operation of the device is very simple and should follow without much description from the discussion of the apparatus above. As shown in Figure 3, the direction of the switch blades is approximately in a vertical position. In this position it will be noted that the sound is approaching from straight ahead or from straight behind, or, in other words, along the line normal to the base of the receivers. As the switch blade is rotated in a clockwise direction, sound is compensated for direction to the right of the normal until the switch blade 30 has reached the contact 77, in which position the receivers are all compensated for sound coming from the right along the base line. The movement of the switch blade may be calibrated, therefore, in directions corresponding to the direction of the approaching sound, and in this manner the direction of the approaching sound may be read directly from the apparatus.

Similarly, when the switch blade is rotated from the position shown in Figure 3 in a counterclockwise direction, the receivers are compensated for sound approaching from the left of the normal to the base line of the receivers. Therefore, this half of the circumference, from the contact 94 to the contact 79 may be calibrated directly in degrees corresponding to the direction from which the sound is approaching on the left. In this manner the operator merely rotates the switch until he has found a place where the binaural synchronism is obtained; that is, until the sound appears to approach from a direction normal to the base line. When this setting has been made, the angular position of the switch will indicate the direction of the sound source, provided this angle is calibrated in the proper units.

An indicator, such as 104, may be attached to the switch 48 and a scale 105 may be mounted concentric with the rotating conducting segment 60 and the contacts 76, 106, etc. As explained above, this scale should be calibrated in degrees to represent the direction from which the sound approaches. The indicator 104 will then give the true direction.

Claims:

1. In a system for determining the direction of a source of wave energy a plurality of receivers of wave energy, a plurality of compensating paths for bringing the energy received by the several receivers into the same phase, said paths having adjustable compensating lengths and feeding the energy of each receiver into the beginning of the compensating length at the next adjacent receiver and indicating means to indicate when said energy is in phase.

2. In a system for determining the direction of a source of wave energy, a plurality of receivers of wave energy, a plurality of compensating paths connected one to each receiver for bringing the energy received by the several receivers into the same phase, means for feeding the energy of each receiver passing through its compensating path into the beginning of the compensating path at the next receiver to bring it into the same phase with the energy received at the next receiver, and indicating means connected with the end receiver to indicate when all the energy is in the same phase.

3. In a system for determining the direction of a source of wave energy a plurality of wave receivers, compensating paths connected one to each receiver having compensating lengths equivalent to the distance between adjacent receivers and switching means for feeding the energy of one receiver into the compensating path connected to the next receiver with the correct compensating length to bring the wave energy into the correct phase.

4. A system for determining the direction of a source of wave energy comprising a plurality of receivers of wave energy and means for compensating the time difference in the arrival of the wave energy at each receiver to bring it into phase at the adjacent receiver, said compensating means serving to feed the wave from one receiver into the beginning of the compensating means at the next receiver, and indicating means to indicate when said waves are compensated.

5. In a system for indicating the direction of a source of sound, a plurality of sound receiving devices, a plurality of compensating lines, means for transferring the variations of said sound receivers to said compensating lines, including switching and reversing relay means, and means for controlling by the position of said switching means the action of said relay means wherein certain of the receiver circuits are always without retardation means in one position of the said relay means and certain other of the circuits are without retardation means in the other position of the said relay means.

6. In a system for indicating the direction of a source of sound, a plurality of sound receiving devices, a plurality of electric retardation lines, electrical circuits including relay means for connecting said receiving devices to said retardation lines, rotary switching means associated with said electric circuits for varying the amount of retardation line connected to each receiver, and means operated by the rotation of said switching means for controlling the operation of said relay means wherein certain of the receiver circuits are always without retardation means in one position of the said relay means and certain other of the circuits are without retardation means in the other position of the said relay means.

7. In a system for indicating the direction of a source of sound, a plurality of sound receiving devices, a plurality of electric retardation lines, electrical circuits including relay means for connecting said receiving devices to said retardation lines, switching means for increasing or decreasing the amount of retardation line associated with each receiver, and means operated in conjunction with said switching means including said relay means for transferring some of said retardation lines from the association with some receivers to other receivers wherein certain of the receiver circuits are always without retardation means in one position of the said relay means and certain other of the circuits are without retardation means in the other position of the said relay means.

8. In a system for indicating the direction of a source of sound, a plurality of sound receiving devices, a plurality of electric retardation lines, electric circuits including relay means for connecting said receiving devices to said retardation lines, and switching means for controlling the operation of said relay means and the amount of retardation associated with each receiver wherein certain of the receiver circuits are always without retardation means in one position of the said relay means and certain other of the circuits are without retardation means in the other position of the said relay means.

9. A system for indicating the direction of a source of sound, a plurality of sound receiving devices, a plurality of electric retardation lines, electric circuits including relay means for connecting said receiving devices to said retardation lines, switching means for controlling the operation of said relay means and the amount of retardation associated with each receiver wherein certain of the receiver circuits are always without retardation means in one position of the said relay means and certain other of the circuits are without retardation means in the other position of the said relay means, a binaural indicator for indicating when said switching means are in position to produce synchronism of the sound received at the receivers, and scale and pointer associated with the position of the switching means for indicating the direction of the source of sound.

10. In a system for indicating the direction of a source of sound, a plurality of receivers, relay means associated with each receiver, a plurality of retardation lines, and switching means for varying the amount of retardation line connected with each receiver, said switching means also including means for operating said relay means when said switching means pass through a given position wherein certain of the receiver circuits are always without retardation means in one position of the said relay means and certain other of the circuits are without retardation means in the other position of the said relay means.

11. In a system for indicating the direction of a source of sound, a plurality of receivers forming groups, relay means associated with each receiver, relay means associated with each group of receivers, switch means for varying the amount of retardation line connected with each receiver and with each group of receivers, said switching means also including means for operating said relay means when said switching means pass through a given position wherein certain of the receiver circuits are always without retardation means in one position of the said relay means and certain other of the circuits are without retardation means in the other position of the said relay means.

In testimony whereof I affix my signature.

BEVERLY R. HUBBARD.